United States Patent [19]

Campas et al.

[11] Patent Number: 5,504,794

[45] Date of Patent: Apr. 2, 1996

[54] DEVICE FOR THE MEASUREMENT OF THE THICKNESS PROFILE OF A METAL PRODUCT IN THE FORM OF A MOVING STRIP OR PLATE

[75] Inventors: Jean-Jacques Campas, Colligny; Stéphane Terreaux, Marange-Silvange; Patrick Vanhee, Briey, all of France

[73] Assignee: SOLLAC (Societe anonyme), Puteaux, France

[21] Appl. No.: 380,685

[22] Filed: Jan. 30, 1995

[30] Foreign Application Priority Data

Feb. 11, 1994 [FR] France .................................. 94 01725

[51] Int. Cl.[6] .................................................. G01B 15/02
[52] U.S. Cl. ............................................ 378/54; 378/58
[58] Field of Search ........................... 378/54, 58, 51, 378/189; 250/370.01, 370.09

[56] References Cited

U.S. PATENT DOCUMENTS

| | | | |
|---|---|---|---|
| 3,638,022 | 1/1972 | Kozlov | 250/370.01 |
| 4,066,898 | 1/1978 | Kamp | 378/54 X |
| 4,587,667 | 5/1986 | Osmont et al. | 378/58 |
| 5,099,504 | 3/1992 | Pettit | 378/54 |
| 5,418,830 | 5/1995 | Florent | 378/54 X |

FOREIGN PATENT DOCUMENTS

| | | |
|---|---|---|
| 914069 | 6/1954 | Germany . |
| 2634183 | 2/1978 | Germany . |
| 57129750 | 3/1985 | Japan . |
| 2097915 | 11/1982 | United Kingdom . |

Primary Examiner—David P. Porta
Attorney, Agent, or Firm—Sixbey, Friedman, Leedom & Ferguson

[57] ABSTRACT

The invention relates to a device for the measurement of the thickness profile of a metal product in the form of a moving strip or a moving plate, of the type composed of an X-ray source emitting in the direction of the said product, an X-ray detection unit (21) located on the other side of the product with respect to the said source, means (22) for processing the signals emitted by the detection unit enabling the thickness profile of the said product to be measured, and means (23, 24) for cooling the detection unit and means for processing its signals, wherein the detection unit and the means for processing its signals are arranged on a support plate (18) fitted with a closure plate (19), the closure plate including electrical (27) and fluid (25, 26) connections necessary for the operation of the detection unit and of the means for processing its signals, in that the support plate is inserted into a box of which one of the side faces has an opening, means (20) for the attachment of the closure plate and means for sealing the join between the box and the closure plate, that face of the box located opposite the product having, facing the detection unit, a window made of an X-ray-permeable material and in that the box is installed in a frame which holds it close to the product.

6 Claims, 2 Drawing Sheets

DEVICE FOR THE MEASUREMENT OF THE THICKNESS PROFILE OF A METAL PRODUCT IN THE FORM OF A MOVING STRIP OR PLATE

FIELD OF THE INVENTION

The invention relates to the field of the measurement of the thickness of metallurgical products, especially ferro-metallurgical products. More precisely, it relates to the measurement of the thickness of moving flat products (sheets, strips, plates) while they are being rolled by virtue of the measurement of the absorption by the said products of X-rays or of any other penetrating electromagnetic radiation.

Complete control of the transverse thickness profile of flat ferro-metallurgical products while they are being hot- or cold-rolled is a major stake in the quality of the products offered to the customer. This complete control requires sophisticated controlling of the rolling operations. In this regard, cold rolling is an important step in that appreciable thinning of the edges of the product inevitably occur if no countermeasure is taken to prevent this. Among possible countermeasures figures the use of bevelled rolls which can move translationally in order to follow the edge of the strip. However, these countermeasures may only be really effective if, in parallel, a reliable installation provides a precise indication of the thickness profile of the product in the region of its edges on leaving the cold-rolling mill. Of course, the thickness of the product in its central area too must be carefully controlled. Its uniformity is an issue essentially during hot rolling but, for the most demanding products (for example steels for packaging and silicon steels), the influence of cold-rolling on their thickness uniformity must also be able to be measured.

Recently, thickness gages for metallurgical products have been developed which employ detection units sensitive to X-rays, such as photodiode arrays. The measurement devices which include such gages often comprise a C-shaped frame surrounding the moving product and arranged transversely to it. Included in the upper and lower limbs of the C are, arranged opposite each other on each side of the moving product, on the one hand, one or more flat-beam collimated X-ray sources, and, on the other hand, one or more gages each composed of a set of photodiode arrays which is intended to detect the X-rays emitted by one of the preceding sources. These gages are arranged so that their arrays are placed transversely to the product, for example, if there are three of them, one in its central region and the other two near its edges. Each photodiode receives radiation whose intensity increases as the thickness of the product facing it decreases. They emit electrical signals which, after suitable processing including a digitizing step, are transmitted to the operator. Taking the results of the measurements carried out at the same instant by all the photodiodes of one and the same array, he can thus obtain an image of the thickness profile of the product in the areas which interest him.

PRIOR ART

Up to now, the arrays and the electronic components which accompany them were simply installed in a parallelepipedal case on which a lead cover sits. This cover was fitted with a window, made of an X-ray-permeable material, vertically in line with the photodiodes. The case also included a cooling device having to remove the heat dissipated by the electronic components. The entire case was installed in the C without any special precautions. Now, experience shows that the harsh environment formed by the rolling mill imposes Draconian conditions as regards the sealing of the detection installation. This environment is, in fact, very wet and if this humidity penetrates into the case, it causes rapid deterioration of the mechanical elements of the gage by corrosion. In addition, temperature gradients inside the case (the photodiodes themselves dissipate virtually no heat, in contrast to the electronic components) cause locally large amounts of water condensation therein. It therefore turns out to be absolutely essential to isolate as reliably as possible the members of the gage from their environment. On the other hand, it is necessary that this absolute requirement should not be able to block the possibility of intervention on the elements of which the gage is composed in order to replace them or to adapt them rapidly to new experimental conditions. These elements must therefore remain rapidly and easily accessible. Furthermore, after such intervention, it is necessary that the sealing conditions should be able to be reconstituted identically.

The aim of the invention is to provide a configuration of the gage and of its environment which make it possible to guarantee that its members are perfectly isolated with respect to the wet environment of the rolling mill, that these same members are very easy to access and that the electronic components of the gage are effectively cooled.

SUMMARY OF THE INVENTION

For this purpose, the subject of the invention is a device for the measurement of the thickness profile of a metal product in the form of a moving strip or a moving plate, of the type composed of an X-ray source emitting in the direction of the product, a unit for detecting the said X-rays which is located on the other side of the said product with respect to the said source, means for processing the signals emitted by the detection unit enabling the thickness profile of the product to be measured, means for displaying this measurement to the operator and means for cooling the detection unit and means for processing its signals, wherein the detection unit and the means for processing its signals are arranged on a support plate fitted at one of its ends with a closure plate including electrical and fluid connections necessary for the operation of the detection unit and of the means for processing its signals, in that the support plate is removably inserted into a box, one of the side faces of which has an opening enabling the said support plate to be inserted, means for the attachment of the said closure plate and means for sealing the join between the side face and the closure plate, that face of the box located opposite the product having, facing the detection unit, a window made of an X-ray-permeable material, a protective shield being provided for absorbing the X-rays capable of reaching the means for processing the signals of the detection unit, and in that the box is installed in a frame which holds it close to the said product.

As will be understood, the invention consists in producing the measurement device in two independent parts. The first part is a parallelepipedal box which is open on one of its faces and intended to be installed, possibly permanently, in a frame in order to be held near the product whose thickness is to be measured. The second part is a support plate intended to be inserted into the box and to which the functional members of the gage are attached. A closure plate is attached at one of the ends of this support plate, which closure plate, when the support plate is inserted into the box, comes to bear against the latter so as to close off the open face thereof. Means are provided for fastening the closure plate and the box in a sealed and removable manner. On its external face, the closure plate carries all the connection means necessary for the operation of the gage: electric-power supply, coolant supply and output of the data.

DESCRIPTION OF THE DRAWINGS

The invention will be better understood on reading the description which follows, given with reference to the following appended figures.

DESCRIPTION OF THE PREFERRED EMBODIMENTS

Figure 1A:
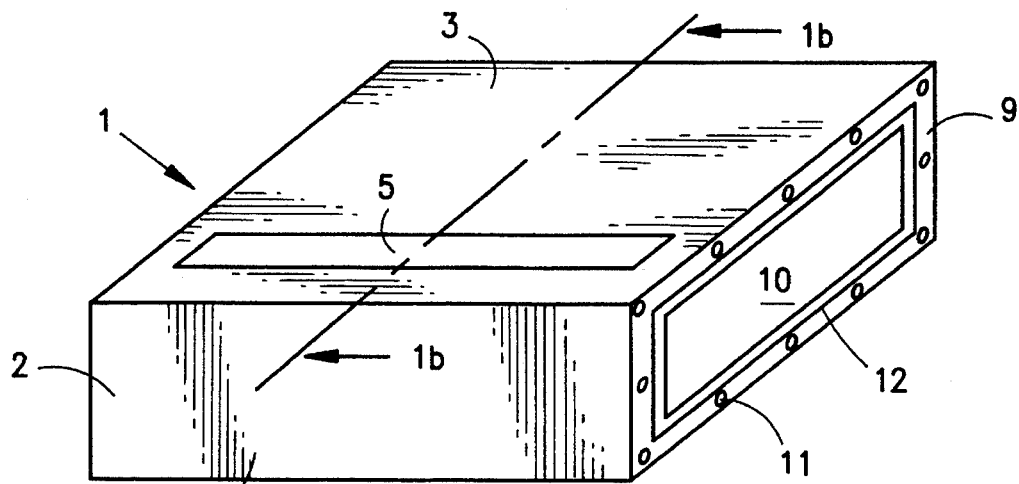
FIGS. 1a and 1b which depict the box, seen respectively in perspective and in cross section along the direction Ib.
Figure 1B:
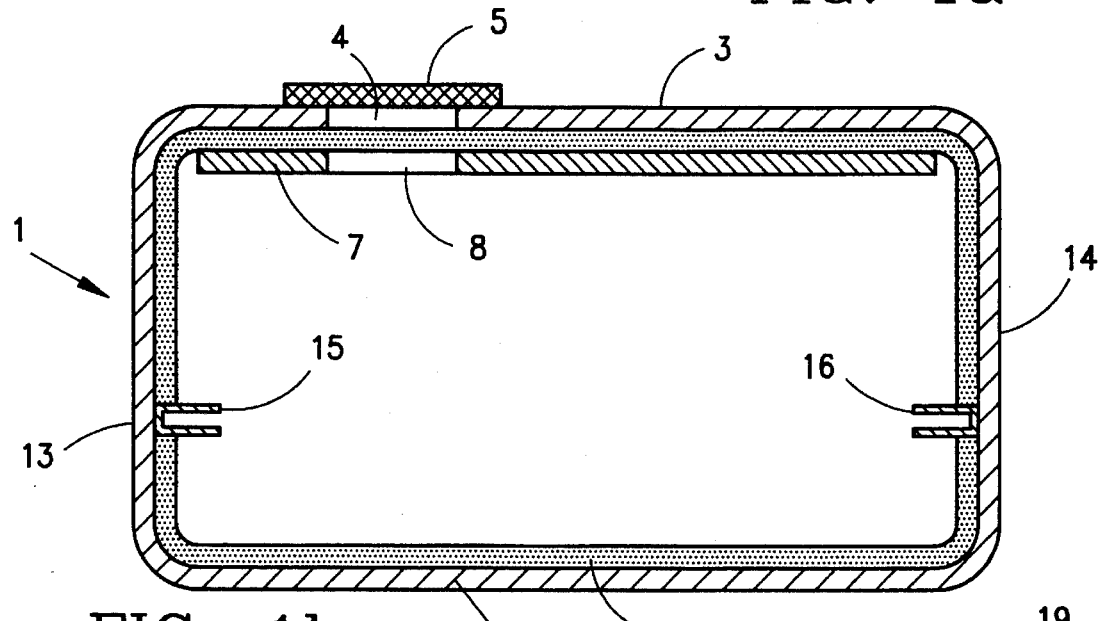

As depicted in FIGS. 1a and 1b, the box 1 is in the form of a rectangular parallelepiped. It is composed of an outer casing 2 made of a material such as steel or brass, ensuring that the assembly has sufficient strength and is therefore mechanically protected satisfactorily. The role of this casing 2 is also to ensure that the gage is electromagnetically protected from the external medium so that possible parasitic electromagnetic fields cannot disturb the operation of the detection and measurement members. On its face 3 intended to be placed opposite the X-ray source, the casing 2 includes an opening 4 which passes right through it and on which sits a plate 5 made of a material having good X-ray-permeability, such as titanium. It is beneath this opening 4 that the X-ray sensitive elements will be placed and the position and size of the opening 4 must consequently be studied. Particular care must be taken to seal the join between the casing 2 and the X-ray-permeable plate 5. On the inside, the casing 2 is coated over all its faces with a layer 6 of an insulating material (refractory foam, for example) ensuring that the gage is thermally protected. On its portion coating the face 3 of the casing 2, the insulating layer 6 is lined with a protective shield formed by a plate 7 made of a material preventing the X-rays from passing through, such as lead. This plate 7 has too an opening 8 extending the opening 4 in the casing 2 so as to allow the X-rays emitted by the source and passing through the product to reach, and only just, the X-ray-sensitive elements. The other members of the gage thus remain shielded from the radiation. As a variant, the plate 7 may be inserted between the casing 2 and the insulating layer 6.

One 9 of the side faces of the box 1, that via which is to be inserted the support for the active elements of the gage, which will be dealt with later, is provided for this purpose with a wide opening 10. The periphery of the face 9, around the opening 10, includes a plurality of tapped holes 11 intended to receive attachment screws, and a sealing ring 12 is trapped in a groove in this face 9. Finally, the side faces 13, 14 of the outer casing 2, which are perpendicular to the cut-out side face 9, carry, over at least part of their length and on their side facing the inside of the box 1, parallel slideways 15, 16 facing each other. Their function will be explained later. The various faces of the box 1 may be assembled by any means ensuring good sealing and good strength of their joints, for example by welding, knowing that the elements of this box 1 will not, in principle, require to be subsequently dismantled.

Figure 2:
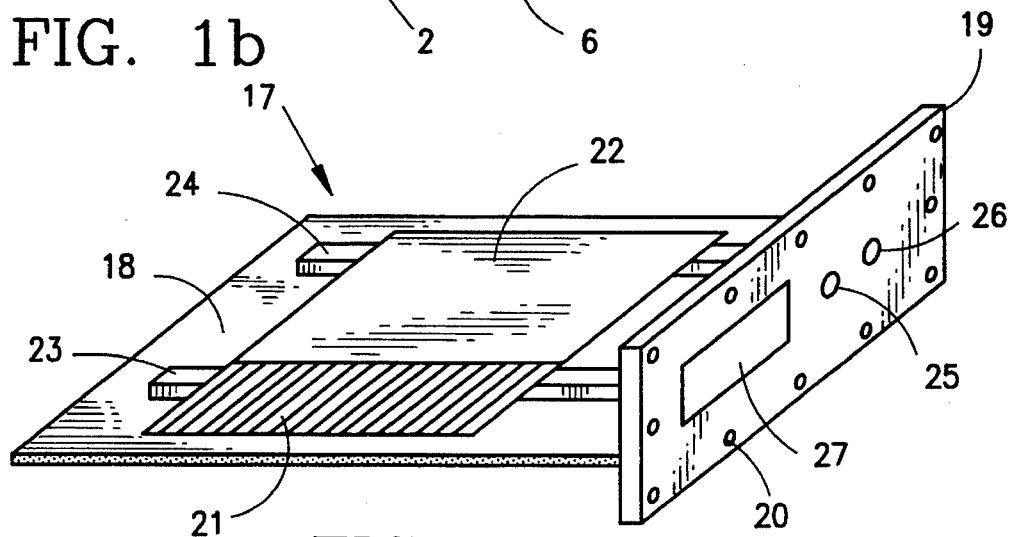
FIG. 2 which depicts the support plate, the functional members of the gage and the closure plate.

In FIG. 2 has been depicted the second part 17 of the device, which, such as a slide, is intended to be inserted into the box 1. This second part 17 includes a support plate 18 whose length and width are equal or slightly less than the internal dimensions of the box 1. A closure plate 19 is attached at one of the ends of the support plate 18 and perpendicularly to it. When the support plate 18 is inserted into the box, it is introduced into the slideways 15, 16 which therefore serve to adjust the position of the support plate 18 (and of the members which it carries) inside the box 1. During this insertion, the closure plate 19 comes to bear against the cut-out side face 9 of the box 1. Since the closure plate 19 is provided on its perimeter with perforations 20 corresponding to the tapped holes 11 in the cut-out face 9, it may be fastened to the box 1 by screwing, and the sealing of their contact is ensured by the sealing ring 12. The active elements of the gage are carried by the support plate 18. They consist, firstly, of a detection unit 21 which consists, for example, of an array of X-ray-sensitive photodiodes, of a length equal to that of that part of the product on which it is desired to measure its thickness, for example approximately 300 to 800 mm for a gage intended to be installed near the edges of a cold-rolled steel strip. The detection unit 21, when the support plate 18 is in place, is located vertically in line with the X-ray-permeable window 5. The other active elements of the gage are formed by the electronic components which process the signals delivered by the detection unit 21, so as to convert them, for the operator, into representative indications of the thickness of the product and of its variations in the area examined. These components are known per se and, for this reason, will not be described in detail nor depicted. They are arranged on a printed circuit 22 fastened to the detection unit 21. They include, inter alia, an analog-to-digital converter, a processing computer and a voltage regulator. Advantageously, the detection unit 21 and the printed circuit 22 are not attached directly to the support plate 18, but to two bars 23, 24 which are themselves attached to the support plate 18. These bars 23, 24 each comprise a cooling circuit using the internal circulation of a fluid such as water. These cooling circuits may be independent or connected to each other. By means of them, it is thus possible to cool the active elements of the gage and to maintain a constant and slightly raised temperature inside the box 1 when the gage is in operation. This is essential for the reliability of the measurement results obtained. It is the electronic components especially that should be cooled, since they are the source of the major part of the heat dissipated in the box 1. A single cooling bar, arranged level with them, could therefore possibly be used. The front face of the closure plate 19 furthermore carries connections 25, 26, for the inlet and outlet of the coolant, which are connected to the cooling bars 23, 24 on its rear face. Finally, it carries a connector 27 by virtue of which it is ensured that, on the one hand, the active elements of the gage are supplied with electric power and, on the other hand, the information delivered by these same elements are collected on the outside of the gage. If, in order to further improve the insulation of the box 1, it is desired to blow a neutral gas into it, this may also be accomplished by means of an orifice (not depicted) made in the closure plate 19 and connected to a gas source.

As a variant, it is also possible to attach the X-ray-stopping plate 7 not in the box 1 but fastened to the support plate 18 so as to make it overhang the active elements of the gage. This plate 7 must then be removable so as to allow free access to these active elements in order to adjust them or to change them.

Figure 3:
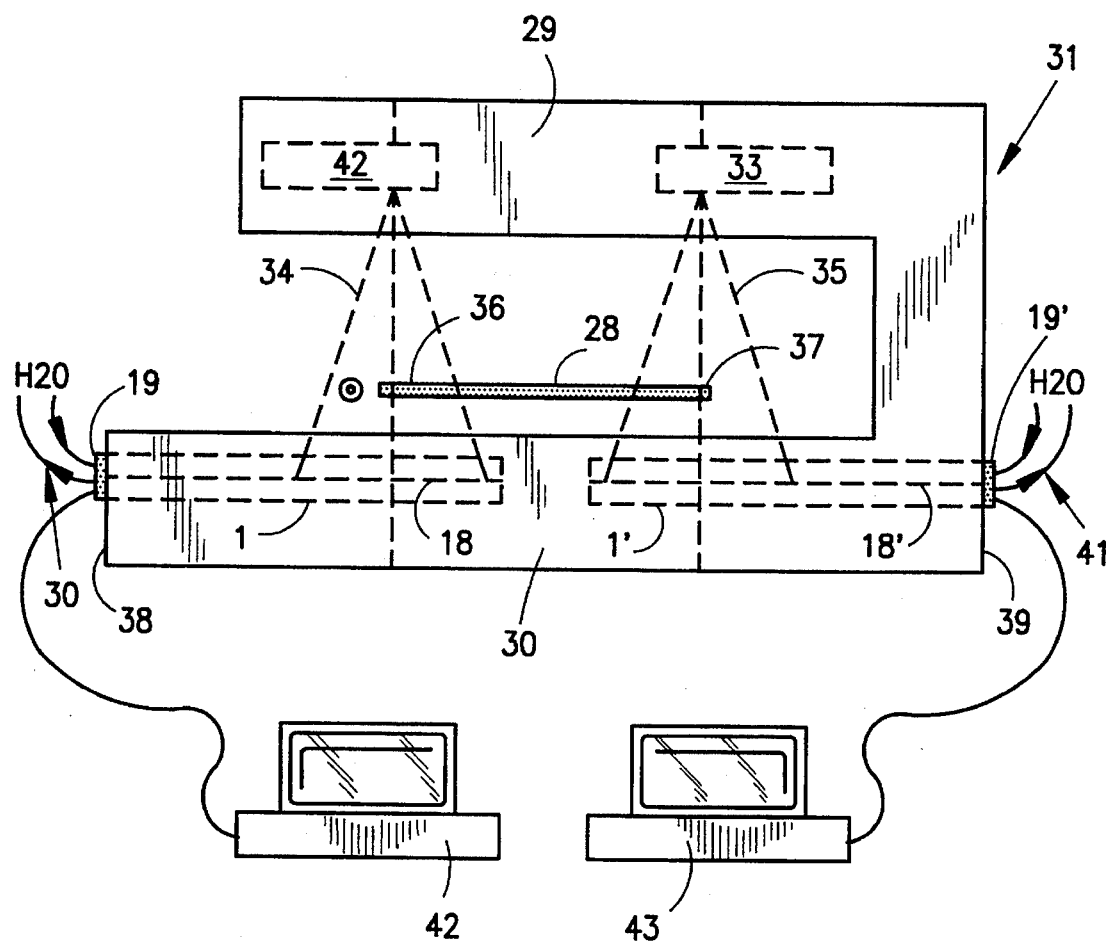
FIG. 3 which depicts diagrammatically the entire installation for measuring the thickness of a moving metal strip, into which are integrated gages according to the invention.

FIG. 3 shows, by way of example, how devices according to the invention may be put in position in an installation for rolling metallurgical products. After it leaves the rolling stand, the strip 28 moving in a plane perpendicular to the plane of the figure passes between the two upper 29 and lower 30 horizontal limbs of a C-shaped frame 31. Integrated into the upper limb 29 are two X-ray sources 32, 33 sending their beams 34, 35 towards the edges 36, 37 of the strip 28. According to the invention, two housings are made in the lower limb of the C, these housings emerging on the side faces 38, 39 of the frame 31, and in these housings are installed, possibly permanently, two boxes 1, 1' identical to the one described previously. They are arranged in such a way that their X-ray-permeable windows 5 lie in the path of the beams 34, 35. Removably inserted into each of these boxes 1, 1' is a support plate 18, 18' of the type described previously, on which the active elements of a gage for measuring the thickness of the product 28 are installed. The closure plates 19, 19' fastened to the support plates 18, 18' are, in the example described and depicted, easily accessible from outside the frame 31. Connected to these closure plates 19, 19' are devices 40, 41 for supplying water (or any other coolant), ensuring that the members of the corresponding gage are cooled, as well as means 42, 43 for displaying to the operator the results of the measurements carried out by the gages. Of course, the frame 31 may also incorporate a device for measuring the thickness of the product 28 according to the invention which would be intended to carry out this type of measurement on the central portion of the product 28, and which would be constructed and installed in the frame 31 according to the same principles as the preceding devices.

This installation, as it has just been described, is advantageous in that the functional members of the thickness gages are permanently well protected from external attacks, insofar as the elements of which the boxes 1, 1' are composed, which provide this protection, never have to be dismantled and thereby afford maximum reliability. On the other hand, should the need arise to carry out intervention on a gage, in order to repair it or to modify its characteristics, it is extremely easy to withdraw the support plates 18, 18' from the boxes 1, 1'. Finally, the gage may operate even when it has been withdrawn from the box 1, 1' so that it is possible to check the operation of it anywhere.

As a variant, cooling means other than the water-circulation bars 23, 24 may be used, such as Peltier-effect elements. Likewise, instead of X-rays, any other type of penetrating electromagnetic radiation may be used.

Of course, the invention applies to the measurement of the thickness profile, not just of steel strips, but of any metallic material in the form of strips or plates.

We claim:

1. A device for the measurement of the thickness profile of a metal product (28) in the form of a moving strip or a moving plate, of the type composed of an X-ray source (32, 33) emitting in the direction of the said product (28), an X-ray detection unit (21) located on the other side of the said product (28) with respect to the said source, means (22) for processing the signals emitted by the detection unit enabling the thickness profile of the said product (28) to be measured, means (42, 43) for displaying this measurement to the operator and means for cooling the detection unit and means for processing its signals, wherein the detection unit (21) and the means (22) for processing its signals are arranged on a support plate (18) fitted at one of its ends with a closure plate (19) including the electrical and fluid connections (25, 26, 27) necessary for the operation of the detection unit (21) and of the means (22) for processing its signals, wherein the said support plate is removably inserted into a box (1), one (9) of the side faces of which has an opening (10) enabling the said support plate to be inserted, means (11) for the attachment of the closure plate (19) and means (12) for sealing the join between the side face (9) of the box and the closure plate (19), that face (3) of the box located opposite the product (28) having, facing the detection unit (21), a window made of an X-ray-permeable material, a protective shield (7) being provided for absorbing the X-rays capable of reaching the means for processing the signals of the said detection unit, and wherein the box (1) is installed in a frame (31) which holds it close to the said product (28).

2. The device as claimed in claim 1, wherein the protective shield (7) is formed by a plate made of a heavy metal, fastened to the box (1).

3. The device as claimed in claim 1, wherein the protective shield (7) is formed by a plate made of a heavy metal, fastened to the support plate (18).

4. The device as claimed in claim 1, wherein the cooling means are formed by at least one bar (23, 24), which includes means for internal circulation of a coolant and which is placed in contact with the detection unit (21) and with the means (22) for processing its signals.

5. The device as claimed in claim 1, wherein the said frame (31) has the shape of a C surrounding the product (28), a horizontal limb (29) of the C including at least one X-ray source (31, 33) and the other horizontal limb (30) including at least one housing for the box (1), arranged facing the said source.

6. The device as claimed in claim 1, wherein the said closure plate (19) is accessible to the operator from outside the said frame (31).

* * * * *